(12) United States Patent
Tian et al.

(10) Patent No.: US 11,376,606 B2
(45) Date of Patent: **\*Jul. 5, 2022**

(54) ADVANCED MANUFACTURING SYSTEM TO RECYCLE CARPET

(71) Applicant: XT Green, Inc., Irvine, CA (US)

(72) Inventors: Xinting Tian, Beijing (CN); Gail Brice, Sunset Beach, CA (US); Lorence Moot, Orlando, FL (US); Frank Lu, Chino Hills, CA (US)

(73) Assignee: XT GREEN, INC., Irvine, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 16/749,878

(22) Filed: Jan. 22, 2020

(65) Prior Publication Data

US 2020/0156082 A1    May 21, 2020

Related U.S. Application Data

(63) Continuation of application No. 15/587,251, filed on May 4, 2017, now Pat. No. 10,576,478, which is a
(Continued)

(51) Int. Cl.
*B02C 23/08* (2006.01)
*C08J 11/06* (2006.01)
(Continued)

(52) U.S. Cl.
CPC ............. *B02C 23/08* (2013.01); *B29B 17/02* (2013.01); *C08J 11/06* (2013.01); *B02C 23/00* (2013.01);
(Continued)

(58) Field of Classification Search
CPC ......... B02C 23/08; B02C 23/00; B02C 23/06; C08J 11/06
See application file for complete search history.

(56) References Cited

U.S. PATENT DOCUMENTS 6,053,441 A    4/2000 Danforth
6,182,913 B1   2/2001 Howe
(Continued)

FOREIGN PATENT DOCUMENTS

EP    2526144    11/2012
WO    9911376    3/1999
(Continued)

OTHER PUBLICATIONS

"LTRF" & "RFA/S" dryers, STALAM Radio Frequency Equipment, brochure, published at least as early as May 2012.
(Continued)

*Primary Examiner* — Faye Francis
(74) *Attorney, Agent, or Firm* — Klein, O'Neill & Singh, LLP

(57) ABSTRACT

An advanced manufacturing plant and process to efficiently deconstruct and recycle post-consumer carpet primarily in an aqueous environment. The water-based technology substantially eliminates airborne particulate emissions into the workplace and the environment. It also significantly increases the quality and quantity of the resources recovered from the carpet. In addition to recycling residential carpet, it also reclaims and recycles material from commercial broadloom carpet.

16 Claims, 9 Drawing Sheets

Related U.S. Application Data continuation of application No. 15/346,598, filed on Nov. 8, 2016, now Pat. No. 9,676,917.

(51) Int. Cl.
    *B29B 17/02*     (2006.01)
    *B02C 23/00*     (2006.01)
    *B29B 17/04*     (2006.01)
    *B29L 31/00*     (2006.01)
    *B29B 17/00*     (2006.01)

(52) U.S. Cl.
    CPC ... *B29B 17/0412* (2013.01); *B29B 2017/0089* (2013.01); *B29B 2017/022* (2013.01); *B29B 2017/0251* (2013.01); *B29B 2017/0289* (2013.01); *B29L 2031/7322* (2013.01); *C08J 2323/12* (2013.01); *C08J 2377/00* (2013.01); *Y02W 30/62* (2015.05)

(56) References Cited

U.S. PATENT DOCUMENTS

| | | | |
|---|---|---|---|
| 6,250,575 | B1 | 6/2001 | White |
| 6,398,138 | B1 | 6/2002 | Robinson |
| 6,752,336 | B1 | 6/2004 | Wingard |
| 7,635,099 | B1 | 12/2009 | Meredith |
| 7,784,719 | B1 | 8/2010 | Wingard |
| 9,144,802 | B2 | 9/2015 | Rees |
| 9,211,545 | B2 | 12/2015 | Rees |
| 9,266,112 | B2 | 2/2016 | Rees |
| 9,550,872 | B2 | 1/2017 | Stone |
| 9,676,917 | B1 | 6/2017 | Tian |
| 10,576,478 | B2 * | 3/2020 | Tian ............ C08J 11/06 |
| 2013/0174517 | A1 | 7/2013 | Kelley |

FOREIGN PATENT DOCUMENTS

| | | |
|---|---|---|
| WO | 2011088437 | 7/2011 |
| WO | 2013106669 | 7/2013 |

OTHER PUBLICATIONS

"RF" dryers, STALAM Radio Frequency Equipment, brochure, published at least as early as May 2012.
"Solids control"—an integral part of brewery's pretreatment system, Rotoshear®/Helixpress® Anheuser-Busch, Case Study, taken from the Internet at least as early as Jan. 2017.
CENSOR plastics recycling, Setting standards, ANDRITZ Separation, brochure, published at least as early as Jul. 2014.
Costs less in the long run, Rotoshear® Delmarva Protein (Tyson Foods), Parkson, Case Study, taken from the Internet at least as early as Jan. 2017.
Efficient, maintenance-free feather screening, Parkson, Case Study, Claxton Poultry, GA, taken from the Internet at least as early as Jan. 2017.
Fine screens are an integral part of cost-effective CSO management, Parkson, Case Study, Village of Deerfield, Illinois, taken from the Internet at least as early as Jan. 2017.
Frank Endrenyi, Carolina Plastics Recycling Council and Carpet Recovery, symposium, presented as early as Nov. 3, 2016.
Green Vulture Process, Green Vulture, LLC, taken from the Internet at least as early as Jan. 2017, URL:"http://www.greenvulture.com/products.htm">.
Heavy-duty screens handle fiber and system upsets, Rotoshear® Fiberglass producer, Parkson, Case Study, taken from the Internet at least as early as Jan. 2017.
Hycor® Rotoshear® Internally-Fed Rotating Wedgewire Screens, Parkson, brochure, taken from the Internet at least as early as Jan. 2017.
Hycor® Rotoshear® Screens—Industrial; Hycor® Helixpress® Dewatering Presses—Industrial, Parkson, Case Study, Anheuser-Busch, TX, taken from the Internet at least as early as Jan. 2017.
Plate and Frame Filter Press, Model XW/1250, PP Frame, Zhejiang Longyuan Filter Press Co., Ltd., website, taken from the Internet at least as early as Jan. 2017, <URL:"http://www.longyuanyl.com/index.php?g=En&m=Products&a=details&id=199">.
Rotoshear screen improves the value of primary offal, Rotoshear® Claxton Poultry, Parkson, Case Study, taken from the Internet at least as early as Jan. 2017.
Rotoshear® EZ-CARE™ Internally-Fed Rotating Drum Screen (web version), Parkson, brochure, taken from the ntemet at least as early as Jan. 2017.
Rotoshear® EZ-CARE™ Internally-Fed Rotating Drum Screen, Parkson, brochure, taken from the Internet at least as early as Jan. 2017.
Rotoshear® Internally-Fed Rotating Wedgewire Drum Screen—Features, Parkson, website, taken from the Internet at least as early as Jan. 2017, <URL:"http://www.parkson.com/products/rotoshear/internally-fed-rotating-wedgewire-drum-screen">.
Rotoshear® Internally-Fed Rotating Wedgewire Drum Screen—Images, Parkson, website, taken from the Internet at least as early as Jan. 2017, <URL:"http://www.parkson.com/products/rotoshear/internally-fed-rotating-wedgewire-drum-screen">.
Rotoshear® Internally-Fed Rotating Wedgewire Drum Screen—Literature, Parkson, website, taken from the Internet at least as early as Jan. 2017, <URL:"http://www.parkson.com/products/rotoshear/internally-fed-rotating-wedgewire-drum-screen">.
Rotoshear® Internally-Fed Rotating Wedgewire Drum Screen—Video Gallery, Parkson, website, taken from the Internet at least as early as Jan. 2017, <URL:"http://www.parkson.com/products/rotoshear/internally-fed-rotating-edgewire-drum-screen">.
Rotoshear® screen cleans up debarking water, Rotoshear® William Bolthouse Farms, Inc., Parkson, Case Study, taken from the Internet at least as early as Jan. 2017.
Rotoshear® screen improves log vat water recycling system, Rotoshear® Texas Plywood Mill, Parkson, Case Study, taken from the Internet at least as early as Jan. 2017.
Rotoshear® screen keeps dehairing line waste out of lagoon system, Rotoshear® Farmland Foods, Case Study, taken from the Internet at least as early as Jan. 2017.
Rotoshear® screen keeps up with potato processor's cutting line waste, Rotoshear® J.R. Simplot, Parkson, Case Study, taken from the Internet at least as early as Jan. 2017.
Rotoshear® screen sceen provides better by-product, Rotoshear® Del Monte, Parkson, Case Study, taken from the Internet at least as early as Jan. 2017.
Rotoshear® screens allow water recycling while minimizing upkeep, Rotoshear® Ocean Spray Cranberries, Inc., Case Study, taken from the Internet at least as early as Jan. 2017.
Rotoshear® screens offer fast payback to pork processor, Rotoshear® John Morrell & Company, Case Study, taken from the Internet at least as early as Jan. 2017.
Rotoshear® screens sweeten the rigors of sugar cane processing, Rotoshear® Rio Grande Valley Sugar Growers, Case Study, taken from the Internet at least as early as Jan. 2017.
Rotoshear® screens update overloaded treatement plant, Rotoshear® Wiliam Bolthouse Farms, Inc., Case Study, taken from the Internet at least as early as Jan. 2017.
Rotoshear® sludge-screening systems protect mills' disposal system, Rotoshear® Pulp and Paper, Case Study, taken from the Internet at least as early as Jan. 2017.
Rotoshear® unit slashes disposal costs, Rotoshear® Oxnard Frozen Foods, Case Study, taken from the Internet at least as early as Jan. 2017.
Rotoshear® units screen flush water in CSS deep tunnel system, Rotoshear® City of Milwaukee, WI, Case Study, taken from the Internet at least as early as Jan. 2017.
Screen simplifies waste treatment system, Rotoshear® Reedsburg Foods, Case Study, taken from the Internet at least as early as Jan. 2017.

(56) References Cited

OTHER PUBLICATIONS

Single Shaft Shredder, 3E Machinery—Products—Parameters, website, taken from the Internet at least as early as Jan. 2017, <URL:"http://www.3e-recycling.com/index.php?m=Product&a=show&id=3">.
Single Shaft Shredder, 3E Machinery—Products—Specification, website, taken from the Internet at least as early as Jan. 2017, <URL:"http://www.3e-recycling.com/index.php?m=Product&a=show&id=3">.
Single Shaft Shredder, 3E Machinery—Products—Videos, website, taken from the Internet at least as early as Jan. 2017, <URL:"http://www.3e-recycling.com/index.php?m=Product&a=show&id=3">.
Solid bowl decanter centrifuge A, ANDRITZ—Mining and minteral . . . —Tar sand—Solid bowl decante . . . , website, taken from the Internet at least as early as Jan. 2017, <URL:"http://www.andritz.com/products-and-services/pf-detail?productid=4860">.
Textile applications—Dryers for loose stock, tow/top slivers and y ams in hanks, STALAM, website, taken from the Internet at least as early as Jan. 2017, <URL:"http://www.stalam.com/it/rf-series-dryers.html">.
The Emerson CLAFLIN Refiner, Bolton-Emerson Americas, website, taken from the Internet at least as early as Jan. 2017, <URL:"http://www.boltonemersonamericas.com/bolten-emerson.asp?ID=6">.
The Tornado Pulper, Bolton-Emerson Americas, website, taken from the Internet at least as early as Jan. 2017, <URL:"http://www.boltonemersonamericas.com/bolten-emerson.asp?ID=5">.
Tom Barret, Notification of Transmittal of the International Search Report and the Written Opinion of the International Searching Authority, or the Declaration, dated Dec. 15, 2017.
Two Rotoshear® screens replace 14 static screens, Rotoshear® Monroe, NG, Case Study, taken from the Internet at least as early as Jan. 2017.
Updating wastewater treatment reduces energy costs, Rotoshear® Potato Processor, Case Study, taken from the Internet at least as early as Jan. 2017.
Upgrade to Pre-Membrane Screens Helps to Cut Maintenance Costs, Parkson, Case Study, Cauley Creek Water Reclamation Facility, GA, taken from the Internet at least as early as Jan. 2017.

* cited by examiner

ADVANCED MANUFACTURING SYSTEM TO RECYCLE CARPET

CROSS-REFERENCE TO RELATED APPLICATIONS

This application is a continuation application of U.S. patent application Ser. No. 15/587,251, filed on May 4, 2017, which is a continuation application of U.S. patent application Ser. No. 15/346,598, filed on Nov. 8, 2016, now U.S. Pat. No. 9,676,917, the entire contents of which are expressly incorporated herein by reference.

STATEMENT RE: FEDERALLY SPONSORED RESEARCH/DEVELOPMENT

Not Applicable

BACKGROUND

The various aspects described herein related to an advanced manufacturing process and plant to recycle carpet.

Homes and businesses utilize carpet. These include residential broadloom carpet which has a taller pile and looser loop design and commercial broadloom carpet which has a short pile with a tight loop to withstand heavy foot traffic. Carpet is primarily made up of a face fiber (e.g. nylon or polyester), backing material (e.g. polypropylene), a filler (e.g. calcium carbonate) and an adhesive to bind the face fiber with the backing material (e.g. SBR latex). Post-consumer carpet (PCC) also has dirt from the carpet use.

When the carpet needs to be replaced, the carpet is discarded and fills the landfills or is sent to waste-to-energy facilities. There is also "pre-consumer carpet waste," also known as "post-industrial carpet" (PIC) waste which has not been installed for consumer use. This includes carpet manufacturer trimmings, rejects, and overruns. Unless otherwise indicated, the use of the term PCC includes the ability to process PIC.

Efforts have been made to recover materials from PIC and residential PCC for recycling into other products but there are certain deficiencies in doing so. These efforts do not include the processing of commercial broadloom carpet which has unique recycling challenges. Additionally, these efforts primarily attempt to recover the face fiber (and sometimes the backing fiber) but not the calcium carbonate, SBR latex adhesive composite and dirt, collectively known as "ash" which is sent to landfills and thus losing over 40% of the amount of the PCC material that is actually recycled.

One common recycling method is shearing the face fiber pile from the surface of residential PCC. This approach only recovers the face fiber that extends above the carpet backing. It is labor intensive and not effective in recovering the significant portion of the face fiber found below the backing. The remaining material, commonly referred to as the carpet carcass is either disposed in landfills or sent to waste to energy facilities. There have been some attempts to also process the carcass material, however, these have similar deficiencies as that of processing whole carpet.

Other common methods attempt to recover the face fiber by processing the whole carpet. These methods include preparing a slurry of the size-reduced mixed fiber into a liquid medium and then separating it using a centrifuge. However, producing the size-reduced mixed fiber from the whole carpet and removing the nodules of calcium carbonate and SBR latex adhesive attached to the face fiber is done through numerous dry processing steps prior to slurrying the fiber and using screens to cut the fiber to shorter lengths This method has certain deficiencies including problems controlling the excessive particulate (i.e. dust) emissions that is generated from the numerous dry processing steps. These airborne particulates can impact worker health and ambient air quality.

Accordingly, there is a need in the art for an improved method of recycling carpet.

BRIEF SUMMARY

A plant and process for recycling carpet is disclosed herein. The method processes the carpet in an aqueous environment in order to minimize and control the particulates and dust generated through the size-reduction process and the efforts to release and remove the nodules of calcium carbonate and SBR latex adhesive composite from the backing that is attached to the face fiber. Processing under water also increases the amount and the quality of nylon fiber recovered and allows for cost-effective recovery of polypropylene backing fiber and calcium carbonate which has previously been considered a waste. Nylon fiber may be either nylon 6 or nylon 6,6 dependent on the type of nylon in the face fiber of the processed carpet. Additionally, it allows for the recycling of reclaimed material from commercial broadloom carpet that previously could not be recovered using other methods.

The plant reduces the carpet in relation to an initial "gross" size reduction step in a dry state that reduces the whole carpet to carpet squares ranging from 2" by 2" to 12" by 12" and more preferable between 4" by 4" to 8" by 8" utilizing a single shaft shredder. Thereafter, the "gross" sized reduced carpet squares are reduced into size-reduced mixed fiber of nylon face fibers and polypropylene fabric backing fibers in an aqueous state. The particulate and dust generated from this "gross" size reduction is minimized because the shredder is not used to reduce the carpet to small pieces and particles (less than 0.5 square inches in size). The reduction of the carpet squares to a size-specific fiber is done under water using a wet pulper and a wet refiner operated in series. The minimized particulates and dust that is generated by the shredder for gross size reduction is controlled by (1) point source emission controls (dust collection integrated into the design of the machine and attached directly to the machine —collects the majority of all generated dust), (2) general area dust collection (unattached dust collection hoods located over a targeted machine) and (3) by the dust collection equipment designed into the dry processing room that collects any low levels of dust not captured by the machine associated equipment. The particulates and dust collected from all three methods may be discharged into the wet pulper to allow for the recovery of this material for recycling. To additionally ensure protection of employee health and prevent emission of particulates to the environment in the case of an upset condition, the dry gross size reduction process is conducted in a room separate from the wet process.

In addition to controlling particulate emissions, processing the carpet in an aqueous environment allows for (1) enhanced removal of the calcium carbonate/SBR latex nodules, (2) multiple washings to produce cleaner fiber, (3) cutting of fiber underwater to enhance fiber separation and increase polypropylene recovery, (4) capturing emissions from the dry processing step as reclaimed product, (5) removal of ash (i.e. the combined term for calcium carbonate, SBR and dirt) prior to fiber separation to reduce processing costs and improve quality of recovered nylon and (6)

maximizing the amount of recovered material (product) for use as recycled content/raw material for manufacturing. The following expands on the elements of the process:

The room in which the carpet is reduced in size to about 4"×4" to 8"×8" controls emissions and mitigates potential impacts from the particulate emissions from the carpet gross reduction process by, starting from the most important first (1) the shredder just needs to reduce the material to about 4"×4" squares to 8" by 8" squares (not down to the fiber as is the case for other method which combine the shredder with a granulator and/or a hammer mill to produce the fiber in the dry state) therefore, less calcium carbonate and dirt is produced and (2) the next level is point source removal of the particulates that we've minimized by (1), finally (3) the separation of the room is just for minimizing noise in the rest of the plant and in case we'd have an upset condition. See discussion above for the three types of dust collection used in the plan. In normal operating conditions, this room will seem to be dust free.

The plant reduces the size of a large format carpet (e.g. room sized carpet) to about 4" by 4" to 8" to 8" in size with a shredder. The shredder and other dry processing equipment is located within a dry processing room or a controlled environment which captures any low levels of airborne particulates caused by the shredder or other dry processing equipment and that might pollute the surrounding area and the environment. The airborne particulates are captured and transferred into the wet pulper for processing through the plant. Moreover, the gross size reduced carpet squares from the shredder is placed in the wet pulper to break down the carpet into its various components (e.g. nylon fiber, polypropylene fiber and calcium carbonate). The wet pulper may be located outside of the dry processing room but at this point, the process is all underwater and the nylon fiber, polypropylene fiber and calcium carbonate remain wet (e.g. mostly greater than 80% moisture but always greater than 15% moisture) until the nylon fiber and polypropylene fiber are dried and pelletized, and packaged for recycling and sold to a buyer. The recovered calcium carbonate product will be sold with the moisture content retained from the processing. By locating the shredder and other dry processing equipment in the dry processing room, any airborne particulates from the equipment is safely collected and does not cause an environmental, employee health or safety issue. Moreover, the collected airborne particulates are introduced into the wet pulper so that any nylon fibers, polypropylene fibers, calcium carbonate, adhesive components, dirt and debris from the trapped airborne particulates can be recycled and not thrown away. Moreover, after any material to be recycled leaves the dry processing room the process places it in water or keeps it at a high moisture content to prevent any airborne particulates which can cause worker health and ambient air quality problems. The process also uses a wet pulper to process the gross size-reduced carpet squares to a mixed fiber and remove the calcium carbonate/SBR nodules and two subsequent washing systems to wash the mixed fiber. The system also cuts the nylon fibers and polypropylene fibers underwater to a short enough length to fully separate the fibers from the rest of the carpet composite; prevent the fibers from forming a bird's nest that can act to hold the fibers together; helps release the calcium carbonate and other carpet ash components that was liberated in the wet pulper that might be trapped within the fibers when long and formed into the bird's nest; prepare the fibers for effective separation by the centrifuge. Washing the short nylon and polypropylene fibers removes the remaining calcium carbonate and other ash components from the exterior surface of the fibers so that the nylon and polypropylene fibers after they are separated have a high degree of purity.

More particularly, a carpet recycling plant for separating nylon fibers, polypropylene fibers and calcium carbonate from carpet is disclosed. The plant may comprise an air controlled room which retains dust and other particles; a shredder for gross reduction of whole carpet to carpet squares sized to about 4"×4" to about 8"×8", the shredder and associated dry processing equipment located within the air controlled room so that the air controlled room captures and processes airborne dust and other particulates emitted from carpet processed through the shredder and other dry processing equipment; a water-based pulper which receives the gross size reduced size carpet composite and further breaks down the carpet to form a carpet slurry; an air exhaust of the air controlled room in fluid communication with a water based pulper to route the dust and other collected particulates from the air controlled room to the water based pulper; a water based refiner to chop the mixed nylon and polypropylene fibers in the slurry to a short, controlled length; water based washing operations to clean the mixed fibers; and a centrifuge receiving the clean slurry of mixed fibers. After the carpet and the ash and other particulates enter the wet pulper, the ash and other particulates and carpet fiber remain wet until the mixed carpet fiber is processed and separated through the centrifuge. The calcium carbonate and other ash components are sold without removing the moisture from processing.

The nylon fibers and the polypropylene fibers may remain above 40% moisture after introducing the carpet and the other particles into the wet pulper and before being outputted of the centrifuge.

The plant may further comprise a water storage tank for recycled water. The water storage tank may be positioned at a higher elevation compared to the wet pulper so that water from the water storage tank is introduced into the wet pulper and other processing equipment by gravity feed.

The water from the storage tank may be introduced into the wet pulper so that the slurry of the carpet and ash particles have a ratio of about 6% solids with the rest being water.

The plant may further comprise a first washer and de-water unit wherein the carpet slurry is processed through the first washer and de-water unit to remove the calcium carbonate, other ash materials from the slurry of mixed fibers of nylon and polypropylene after being processed through the wet pulper.

The plant may further comprise a water treatment area. The calcium carbonate, other ash materials and water from the first washer and de-water unit may be transferred to the water treatment area to remove the water from the calcium carbonate so that the calcium carbonate is greater than 30% calcium carbonate and the water is cleaned and returned to a water storage tank which feeds water into the wet pulper and other wet processing equipment.

The plant may further comprise a refiner. The slurry of mixed fibers of nylon and polypropylene may be cut under water to a short length in the refiner so that the nylon fibers and polypropylene fibers in the slurry do not form a bird's nest configuration and are prepared for processing in the centrifuge.

The mixed nylon fibers and polypropylene fibers in the slurry may be cut to about 5 mm long.

The plant may further comprise a second washer and de-water unit which receives the slurry of the short length nylon and polypropylene fibers and agitates the nylon and polypropylene fibers to remove residue and other material on an exterior surface of the nylon and polypropylene fibers and further separate calcium carbonate, other ash materials and water from the nylon and polypropylene fibers. The separated calcium carbonate, other ash materials and water may be transferred to a water treatment area to remove the water from the calcium carbonate so that the calcium carbonate is greater than 30% calcium carbonate and the water is cleaned and returned to a water storage tank which feeds water into the wet pulper and other wet processing equipment.

The plant may further comprise a centrifuge feed tank which receives the slurry of the clean nylon and polypropylene fibers from the second washer and de-water unit and receives additional water to reduce the solids percentage in the fiber slurry to about 2% solids.

The plant may further comprise a two stage centrifuge that receives the slurry of nylon and polypropylene fibers that may be maintained at a 2% solids ratio with water and separates the nylon fibers from the polypropylene fibers. The centrifuge may be a two stage centrifuge. It is also contemplated that the centrifuge may have other suitable configurations.

The plant may further comprise a polypropylene de-water unit that receives the polypropylene fibers from the centrifuge to bring a moisture content of the polypropylene fibers down below 30% and a polypropylene fiber dryer to bring the moisture content of the polypropylene fibers down to about 3% water.

The plant may further comprise a nylon fiber dryer that receives the nylon fibers from the centrifuge to bring the moisture content of the nylon fibers down to about 3% water.

In another aspect, a process of recycling carpet to separate nylon fibers, polypropylene fibers and calcium carbonate from the carpet is disclosed. The process may comprise the steps of receiving carpet in an air controlled room; introducing carpet into a shredder which is located in the air controlled room; trapping ash and other particulates emitted from the shredder within an air controlled room; transferring the trapped ash and other particulates from the air controlled room to a wet pulper which is located outside of the air controlled room; transferring gross sized reduced carpet outputted from the shredder into the wet pulper; maintaining the ash and other particles and the gross reduced sized carpet in a wet state slurry until at least after the ash and other particles are substantially removed and the carpet fibers are processed through a centrifuge.

The process may further comprise the step of introducing water into the wet pulper by gravity to bring the solid to water ratio of the carpet slurry down to about 6% rapidly.

The process may further comprise the steps of cutting mixed nylon and polypropylene fibers in the carpet slurry to a sufficiently short length so that the nylon and polypropylene fibers are prepared for processing by the centrifuge and do not form a bird's nest; and washing the nylon fibers and polypropylene fibers to remove residue and other material on exterior surfaces of the nylon and polypropylene fibers and separate calcium carbonate and other ash components from the nylon and polypropylene fibers.

The process may further comprise the step of introducing the cut and washed short length nylon and polypropylene fibers into the centrifuge to separate the nylon fibers and the polypropylene fibers.

DETAILED DESCRIPTION

Figure 1:
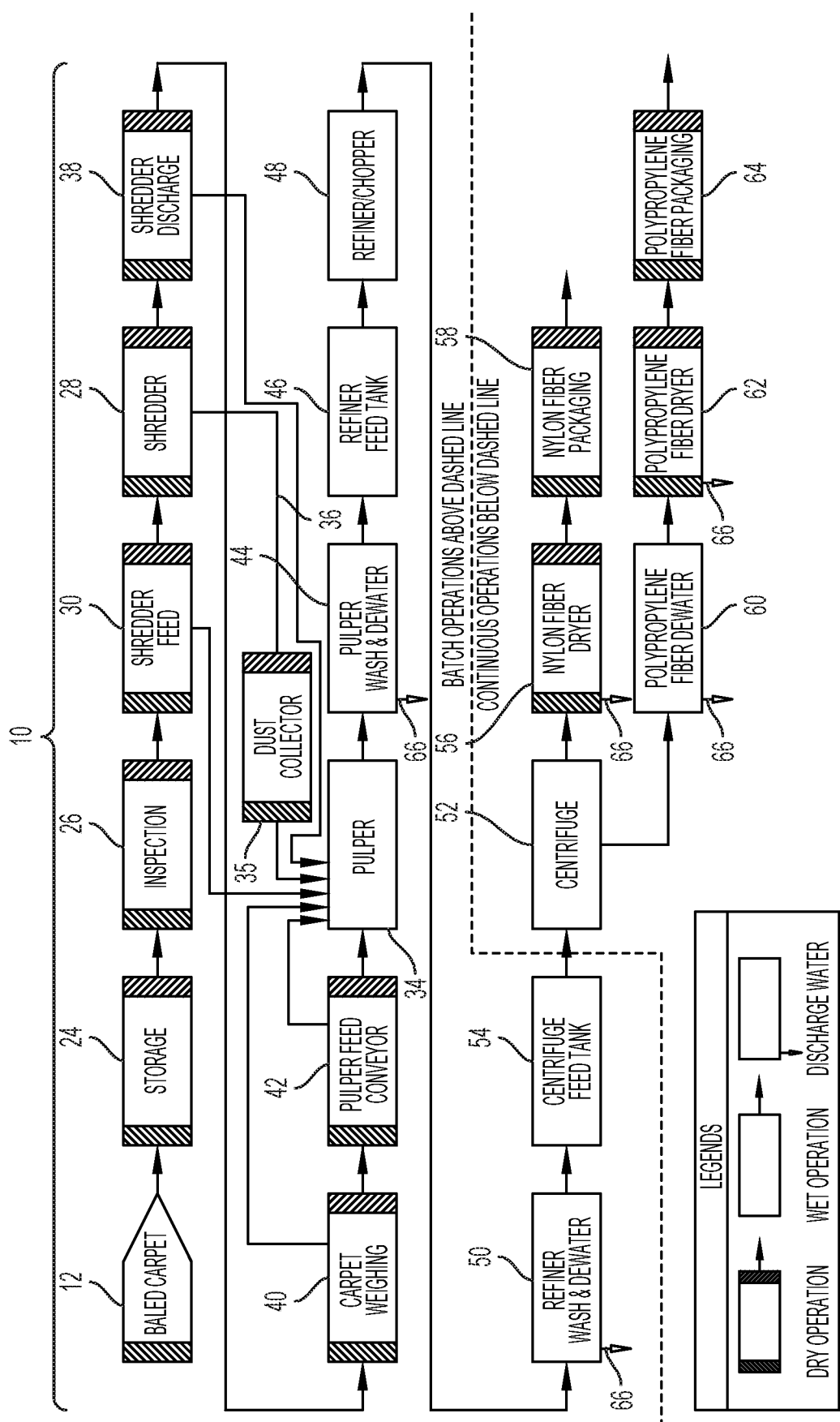
FIG. 1 is a flowchart of a carpet recycling process.

A carpet recycling plant 22 and process 10 of recycling post-consumer carpet to separate nylon fibers, polypropylene fibers, calcium carbonate and other materials within a carpet 20 is disclosed herein. The carpet 20 is initially processed in a dry processing room 32 to reduce the size of the carpet 20 to about 4" by 4" to about 8" by 8" from a larger format (e.g. room sized carpet). The dry processing room 32 is an air controlled room so that dust and other particulate materials produced from the reduction process (i.e. shredder 28) and other dry processing equipment does not escape into the environment and cause an environmental, employee health or safety issue. The reduced size carpet is transported and put into a wet pulper 34 which may be located outside of the dry processing room 32. Dust and other particulates produced by the reduction process may collectively contain nylon fibers, polypropylene fibers, calcium carbonate and household dirt. The dust and other particulate matter is introduced into the wet pulper 34 in order to capture the fibers and calcium carbonate and recycle the same. Once the dust and other particulate matter and the reduced size carpet is introduced into the wet pulper 34, the rest of the processes is performed in a wet state or underwater so that the small particles do not become airborne. If some of the particulates do become airborne, dust accumulators 88 may be positioned at key locations in order to capture the particulates. The particulates may be reintroduced into the wet pulper 34 to recycle fibers and calcium carbonate that might make up the dust particles. The plant 22 and process 10 efficiently separates the nylon fibers, polypropylene fibers and recovers the calcium carbonate so that individually, the nylon fibers and polypropylene fibers have a high purity content (i.e. above 90%, and more preferably above 98%). The plant 22 and the process 10 also manages emissions of particulates that if introduced into the workspace or the atmosphere would cause respiratory problems and other issues for those people that might inhale the particulates and also contribute to local air pollution and global warming.

More particularly, referring now to FIG. 1, a block flow diagram showing the carpet recycling process 10 is shown. When a homeowner or business replaces carpet, the old carpet is removed when the new carpet or other types of flooring is installed in its place. The removed carpet includes both residential broadloom carpet which typically has a taller pile and looser loop design and commercial broadloom carpet which has a short pile with a tight loop to withstand heavy foot traffic. The various components of the old carpet may be separated and then recycled in order to minimize or eliminate waste from the old carpet being disposed in landfills or sent to waste to energy facilities. The recycling of the nylon and polypropylene components of the old carpet also replaces virgin raw material produced from refining petroleum thus reclaiming this material from old carpet also saves petroleum resources and eliminates the greenhouse gas emissions released through producing the virgin nylon and polypropylene material. Although the carpet recycling process 10 is being described in relation to an old used carpet which has exceeded its lifespan, the carpet recycling process 10 may be used to recycle new carpet that might be no longer useful, remnants, or other reasons that might render the new carpet unusable. The process may be used to recycle some or all of the components that are used to manufacture carpet (e.g. carpet manufacturer trimmings, rejects, and overruns).

The carpet 20 being recycled may have a nylon face fiber with a woven polypropylene primary backing 16 into which is tufted the nylon face fibers 14. The backing system also 18 glues and adheres the nylon face 14 and polypropylene primary backing 16 together. The backing adhesive system may contain styrene butadiene rubber (SBR) and calcium carbonate as a filler. A large percent of the backing system 18 is comprised of the calcium carbonate. Accordingly, the following discussion of separating the backing system 18 (which includes the polypropylene primary backing fiber 16) from the nylon face 14 may also be placed in the context of separating the calcium carbonate and the SBR (i.e., backing system, ash) from the nylon face 14 and the polypropylene primary backing fiber 16. However, such language and discussion should also be applied to separating the ash components of the backing system 18 from the nylon face 14 and the polypropylene primary backing fiber 16.

The process 10 reclaims all three main components, namely, the nylon face which is either nylon 6 or nylon 6,6 fiber dependent on the type of carpet processed, the polypropylene used for the primary backing which is fabricated from polypropylene fiber and the backing system 18 which is comprised of an SBR adhesive system containing calcium carbonate filler. The backing system 18 when being separated from the nylon face 14 and the polypropylene primary backing 16 may also be referred to as ash or calcium carbonate since calcium carbonate is a major component of the backing system 18.

The carpet to be recycled may be provided to a carpet recycling plant in a baled format. The preferred format is baled carpet but other formats are also possible including but not limited to loose carpet. In either case, nylon face fiber carpet needs to be sorted out from other face fibers types using a Near IR (NIR) spectroscopy handheld analyzer (or other analyzer) and additionally separated into nylon 6 and nylon 6,6 carpet bales which is processed separated. The loose carpet may be any size from small pieces (i.e., >12"×12") up to a room size carpet or rolled unused carpet. Carpet 12 may be collected at a carpet recycling plant 22 or at a carpet collection/sorting facility and stored 24 on-site or off-site. The baled carpet 12 is unbaled and may be inspected 26 to ensure that the carpet 12 is processed with other carpet 12 of similar characteristics (e.g. nylon 6 vs. nylon 6,6) and that no foreign objects are within the carpet 12 and that it is suitable to be inserted into a shredder 28. After the carpet 12 is inspected, the carpet 12 is placed on a shredder feed 30 which transfers the carpet 12 into the shredder 28 located in a dry processing room 32. The dry processing room 32 contains and controls all of the dust and particulates produced by the shredder 28 which reduces the carpet 12 to a size of approximately 4" by 4" to 8" by 8". The carpet in the baled carpet 12 may be larger than that size and be uncut from a large room size carpet size. The baled carpet 12 may be brought into the dry processing room 32 with a forklift or pallet jack, unbaled and then loaded onto the shredder feed conveyor 30 by hand or by mechanical means.

Figure 5:
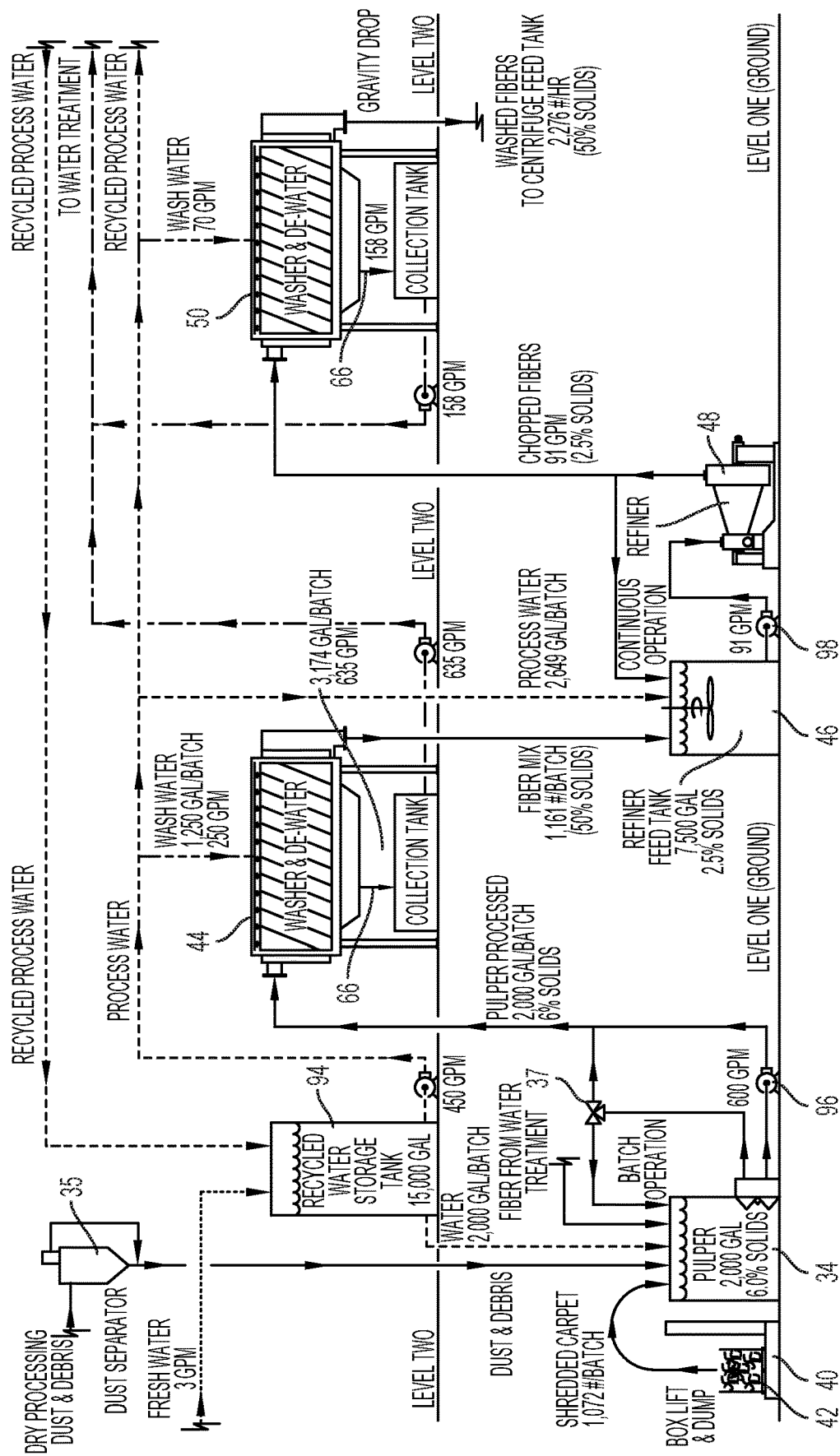
FIG. 5 is a schematic diagram of a wet pulper and a refiner with washer and dewater units.
Figure 6:
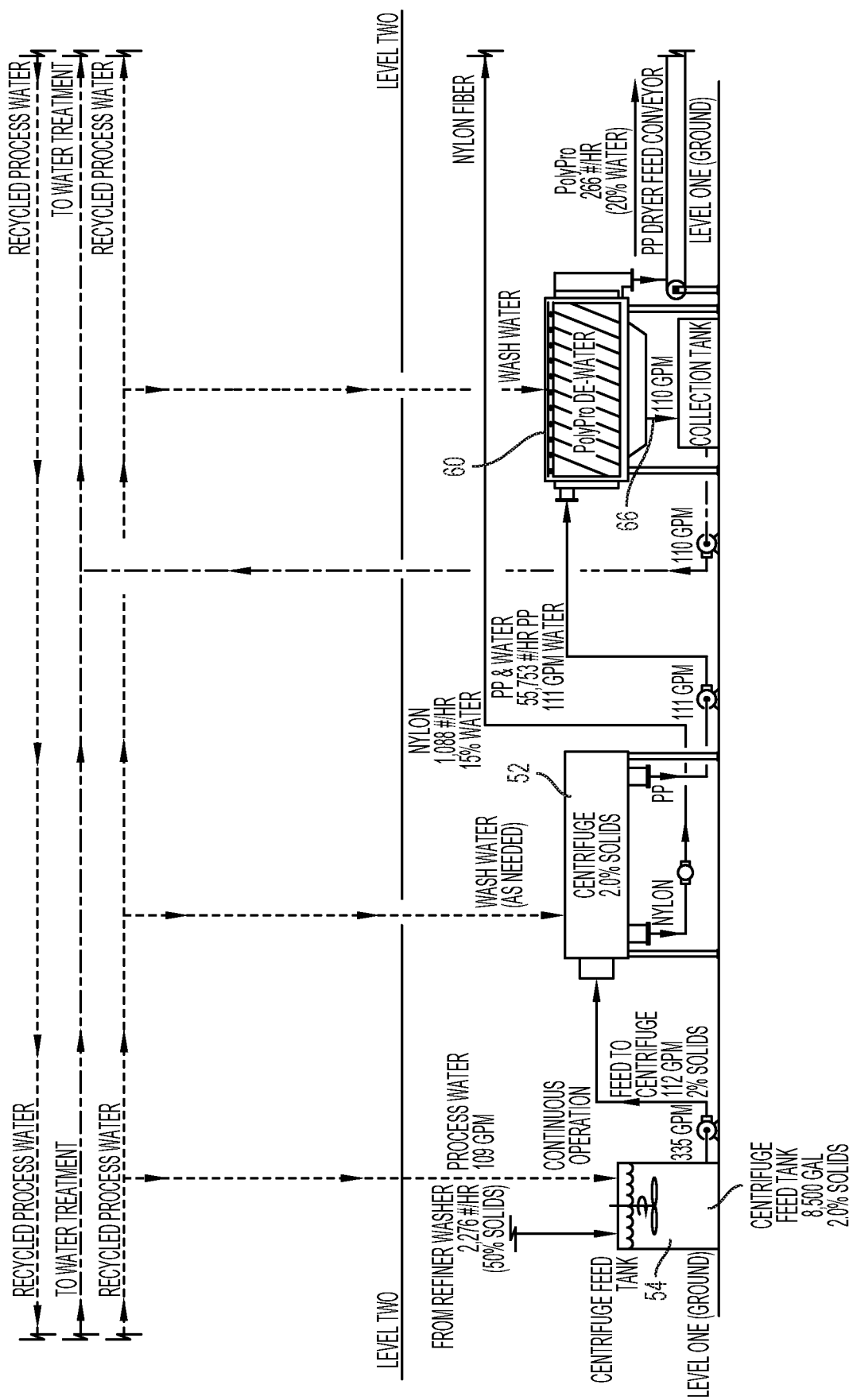
FIG. 6 is a schematic diagram of a centrifuge.

The shredder feed 30 introduces the carpet 12 into the shredder 28 to reduce the carpet to a size of approximately 4" by 4" to 8" by 8". This process of gross size reduction of the carpet in the shredder 28 produces airborne particulate dust. This dust is contained both by equipment attached to the shredder 28 and in the dry processing room 32. The dry processing room 32 is an air controlled room that does not allow particulates from inside the room to escape out of the room and into the environment. Dust may be comprised of nylon fibers, polypropylene fibers, calcium carbonate and other materials comprised of the backing system 18 and household dirt. Some of the dust will be suspended in air as airborne particulates and some of the dust will also be too heavy and fall to the ground. The dry processing room 32 may have a general area dust collection 88 which collects the airborne particulates and introduces that dust into an air separator 35 (see FIG. 5). Additionally, the dust that falls to the ground may be swept up or vacuumed up and introduced into the wet pulper 34. The dust that is suspended in air and the dust that falls to the ground is introduced into the wet pulper as shown by process line 36 (see FIG. 1). Also, the shredder feed 30, shredder discharge 38, carpet weighing 40 and the pulper feed conveyor 42 may have a dust collection unit which routes the dust to the pulper 34. Solid waste from unauthorized materials in the carpet bales may be generated and removed from the dry processing room 32 at a rate of about 80 pounds per hour and 22 pounds per hour from the shredder 28. The solid waste may be introduced into the pulper 34 or sent to a landfill or another recycler Dust collected with the general area dust collection 88 is sent to the dust separator 35 shown in FIG. 5. The dust separator 35 also may internally recycle the air so that no air is outputted from the plant. The dust separator 35 separates the dust containing nylon fibers, polypropylene fibers, calcium carbonate and other material and introduces the dust into the wet pulper 34. From the shredder 28, gross size reduced carpet is outputted from a shredder discharge 38. The gross size reduced carpet may be transported in a transport box 90 and transported to the wet pulper 34 or placed on a belt or pneumatic or other conveyor which transports the gross size reduced carpet to the wet pulper 34. The conveyor system may also include a weighing system.

In order to introduce the dust suspended in air and dust that falls to the ground into the wet pulper 34, that dust along with the gross size reduced carpet exiting from the shredder discharge 38 may be weighed 40. The dust and the gross size reduced carpet are introduced into the wet pulper 34. Water from a recycled water storage tank 94 is also introduced into the wet pulper so that the slurry mixture in the wet pulper 34 is at about 6% solids with the rest of the slurry being water. The 6% target percentage of the slurry is preferred but may be between less than 1% and 15%. The amount of water introduced into the wet pulper 34 from the recycled water storage tank 94 is performed at a high rate of transfer. To achieve such a high rate of transfer, the recycled water storage tank 94 may be placed at an elevation higher than the wet pulper 34 so that the water from the recycled water storage tank 94 may be gravity fed into the wet pulper 34. The wet pulper 34 is a batch process. However, a continuous process is also contemplated. As such, gross size reduced carpet and dust particulates from the dry processing are introduced into the wet pulper 34 and water from the recycled water storage tank 94 is introduced into the wet pulper to achieve a target percent solid in the slurry. Since it is a batch process and the wet pulper 34 is large, a large amount of water is required (e.g. 2000 gallons per batch). Hence, the gravity feed aids in maximizing the speed at which water is introduced into the wet pulper 34. The dust and the gross sized reduced carpet are now underwater and may be cut up and shredded to complete the primary size reduction underwater and to completely disassemble the nylon face fiber, polypropylene primary backing fiber, secondary backing system 18 and other materials from each other. Any dust particles produced from the process of completely disassembling the nylon face 14, polypropylene primary backing fiber 16 and the secondary backing system 18 remain in the water to prevent any particulates that might be generated in the pulping process to remain in the water and eliminate dust from escaping into the plant or to the atmosphere. The tank and the wet pulper 34 are placed outside of the dry processing room 32. The dust, other materials and gross size reduced carpet may be introduced into the wet pulper 34 via the transport box 90 or a pulper feed conveyor 42.

Figure 2:
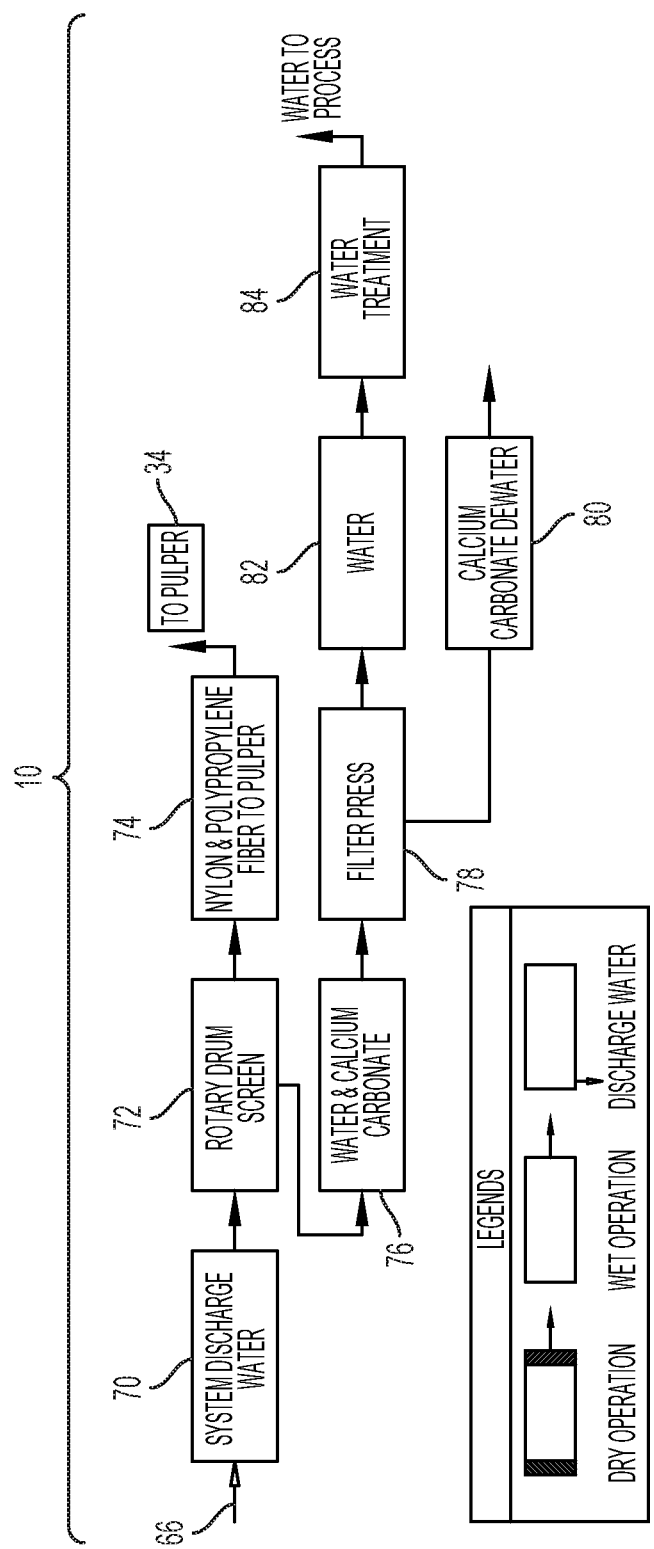
FIG. 2 is a flowchart of a water treatment process of the carpet recycling process.
Figure 3:
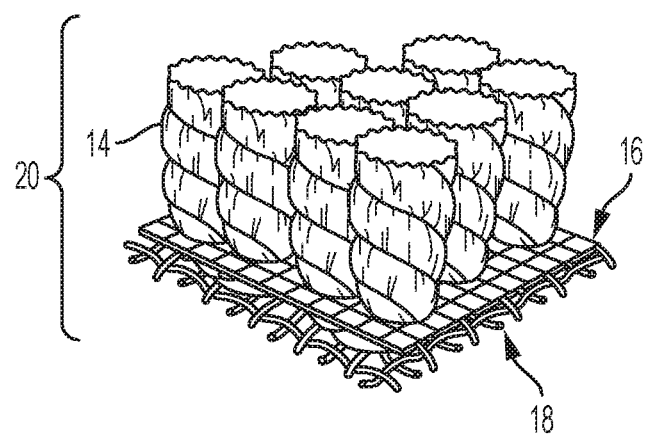
FIG. 3 is a perspective view of the carpet with the cut pile.
Figure 3A:
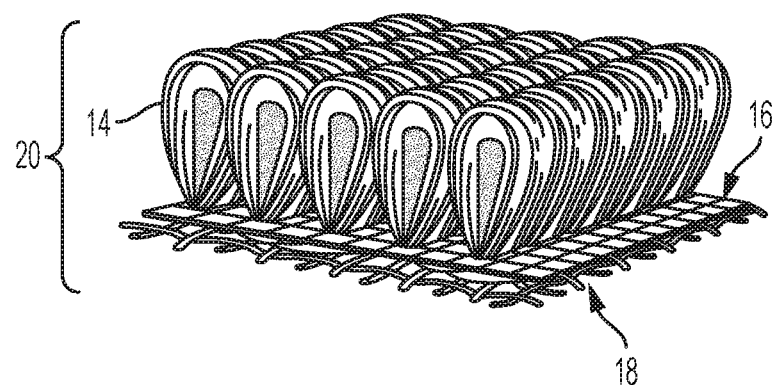
FIG. 3A is a perspective view of the carpet with a looped pile.

The recycled water storage tank 94 may be filled with about 50,000 gallons of water. Most of the water that is used in the process 10 is retained in the process 10 and is recycled and cleaned and transferred back into the recycled water storage tank 94. By way of example and not limitation and as discussed herein, water used in the system is treated as shown in FIG. 2 then put back into the tank 94. Water is introduced into the tank and a rate of about 3 gallons per minute to replace any loss of water from the process 10 due to evaporation, product moisture (primarily in the calcium carbonate) and other minor losses. However, the 3 gallons per minute introduction of new water into the tank 94 is all that is needed in order to maintain the process 10.

The operation of the wet pulper 34 may be a batch operation. When the wet pulper is running a batch, a pump motor 96 is off. Also, a three-way valve 37 directs the circulating flow back into the wet pulper 34 tank. The wet pulper 34 completes the size reduction underwater and disassembles the nylon face fiber, polypropylene primary backing fiber, the other backing system materials 18 and all the materials from each other. and circulates the carpet slurry until the required disassembly has been accomplished with the wet pulper 34. Once the wet pulper 34 has completed the size reduction and disassembly of the carpet components, the three-way valve 37 is activated to direct the slurry to the washer and dewater unit 44 and the pump 96 is turned on so that the pulped carpet (i.e., carpet slurry) may be introduced into the washer and dewater unit 44.

The wet pulper 34 may be a batch process. It may process about 1072 pounds of gross size reduced carpet per batch which would require about 2000 gallons of water to achieve a 6% solids ratio between the carpet that has been further sized reduced in the pulper water to produce the carpet slurry. However, other ratios between the pounds of size reduced carpet and gallons of water are also contemplated to achieve other than 6% solids ratio in the carpet slurry.

Carpet is fabricated in order to be very durable and resilient to daily wear and use. To this end, the nylon face fiber or yarn 14 is tufted into the polypropylene primary backing 16 as a U-shaped cut-pile fiber or as a continuous loop fiber. The face fibers extend upward from one side of the polypropylene primary backing 16 and the bottom of the tufted fiber is contained on the other side of the polypropylene primary backing 16. In order to hold the tufted fiber to the polypropylene primary backing 16, the bottom is adhered to the polypropylene primary backing 16 by an adhesive system that may contain styrene butadiene rubber (SBR) and calcium carbonate as a filler. This adhesive, the bottom portion of the tufted face fiber and some portions of the polypropylene primary backing and the calcium carbonate is referred to as a nodule and is very hard to remove and disassemble so that the nylon face fiber 14, polypropylene fiber 16 and the backing system 18 (i.e. the calcium carbonate, SBR and household dirt collectively called ash) are completely disassembled to the extent that will allow them to be separated from each other and recycled.

The wet pulper 34 is an aqueous based pulper and very effective in removing nodules completely so that the mixed nylon and propylene fibers can be separated from the backing system 18. The wet pulper 34 produces a slurry made up of the components of the size reduced, pulped carpet. The dilute carpet slurry is pumped out of the wet pulper 34 and is introduced into a washer and dewatering unit 44. The washer and dewatering unit may be a motorized horizontal rotating drum with holes around the drum. The carpet slurry which is comprised of 94% water with the remaining 6% being solids consisting of the mixed nylon and polypropylene fibers and the carpet ash (i.e. the calcium carbonate, SBR and household dirt) is dropped into the center of the drum. Water spray bars located inside the drum wash the carpet slurry as it passes through the drum. The mass of water, mixed fibers and the ash from the carpet backing is turning and being washed at the same time due to the turning of the drum. The inside surface of the drum cylinder is supplied with diverters that move the carpet slurry down the length of the drum. The mixed nylon and polypropylene fibers remain inside the drum, and the water along with the carpet ash (i.e. calcium carbonate and other non-fiber solid material) pass through the holes of the drum and are collected and transferred into a collection tank which is pumped to the water treatment process shown in FIG. 9. The fibers retained in the drum include the mixed nylon fibers and polypropylene fibers. Some of the carpet ash from the backing system 18 are retained in the drum because some of the nylon and polypropylene fibers can be very long and are tangled to each other and form a bird's nest configuration which traps the calcium carbonate of the backing system 18. The wash and dewatering unit 44 is a gross separator and separates and removes most of the calcium carbonate and the other components of the backing system 18 from the fibers of the nylon face 14 and the polypropylene primary backing fiber 16.

The nylon fibers and the polypropylene fibers are generally between about 10 mm to 100 mm in length but also small amounts of fibers i.e. fines <10 mm may be included. The wet pulper 34 further reduces the gross size reduced carpet which is introduced into the wet pulper 34 at a size of about 4" by 4" to 8" by 8" down to mixed size-reduced nylon face fibers and size-reduced polypropylene primary backing fibers; and initiates the separation of the mixed nylon and polypropylene fibers from the calcium carbonate and other ash materials (i.e. adhesive and dirt). The mixed nylon and polypropylene fibers may have a length between 10 mm to 100 mm but may have a portion of fibers having a length less than 10 mm. Additionally, the mixed nylon and polypropylene fibers and any calcium carbonate trapped within the fibers are at about 50% solids when exiting the washer and dewatering unit 44.

In the pulper wash and dewater unit 44, the mixed fibers may be cleaned by the action of internal water sprays in the rotary drum screen and by the rubbing of the fibers against each other acting to remove the ash, residue and adhesive from the surface of the fibers. This may remove the calcium carbonate and other ash materials for collection and recycling and cleans the mixed fibers. This unit may be the same as the wash and dewater unit after the refiner but with a 2 mm screen size. It is also contemplated that the wash and dewater unit 44 may be removed from the process so that the pulped carpet slurry is transferred to the refiner 46 without processing by the wash and dewater unit 44.

The mixed nylon fibers and the polypropylene fibers and remaining calcium carbonate and other ash components are introduced into a refiner feed tank 46 at about 50% solids and 50% water. Additional water is introduced into the refiner feed tank 46 to achieve a slurry of about 2.5% solids ratio with water by weight. Although the stated preferred target for the slurry is 2.5% solids, water may be introduced in order to achieve a percentage of about 2% to about 5%. The percent solid for the slurry for the refiner is less than the target percent solids for the wet pulper slurry but greater than the percent solids for the slurry in the centrifuge feed tank 54 discussed below. A refiner/chopper 48 reduces the length of the mixed fibers of the nylon and polypropylene to a consistent size of about 5 mm plus or minus 1 mm. The mixed fibers are introduced into the refiner feed tank and process water is also introduced in order to bring the slurry mixture of the water and fiber to about 2.5% solid. 90% or more of the calcium carbonate and the components of the backing system 18 was removed at the wash and dewatering unit 44. The wash and dewatering unit 44 may have a rotary drum 2 mm screen size. At this point, the mixed fiber looks clean but there is still calcium carbonate and other ash components mixed with the fibers. Non-calcium carbonate ash components may be adhesive, household dirt, soap, carpet treatments, etc. Moreover, by reducing the size of the mixed fibers to 5 mm, the fibers are no longer bunched up into a bird's nest configuration and therefore do not function as a filter trap that traps loose ash but rather the loose ash can now be released through the action of the internal water sprays in the rotary drum screen and by the rubbing of the fibers against each other. The released loose ash (e.g. primarily calcium carbonate) is transferred with the wash water to the collection tank.

The water and mixed fiber cut by the refiner are introduced into a second wash and dewater unit 50 which is the same as the wash and dewater unit after the wet pulper 44 (e.g., 2 mm rotary drum screen size) except with a smaller rotary drum screen size (e.g., 1 mm screen size). The rotary drum screen size holes in the refiner wash and dewater unit are smaller because the mixed fibers are shorter and the goal is to retain the mixed fibers in the drum while washing away the majority of the remaining ash.

The mixed fibers when long (i.e. greater than 1 inch), may form a bird's nest and act like a filter trap that traps the ash—including but not limited to calcium carbonate, adhesive and other materials used in the manufacturing and maintenance of the carpet during its life such as soap, stain resistant treatment, etc. When the mixed fibers are short (i.e. about 5 mm long or less), the fibers no longer form a bird's nest configuration and do not act like a filter trap. The calcium carbonate and other materials are released and residue on the fibers themselves now need to be removed from the fibers. In the refiner wash and dewater unit 50, the mixed fibers are cleaned by the action of internal water sprays in the rotary drum screen and by the rubbing of the mixed fibers against each other acting to remove the ash, residue and adhesive from the surface of the fibers. This cleans the fibers. Additionally, during use of the carpet, additional chemicals may be used on the carpet. By way of example and not limitation, the carpet may be washed with a soap or stain resistance chemicals may be applied to the exterior of the fibers. These chemicals and coatings must be removed from the mixed fiber in order to increase the purity of the separated fibers when being recycled. The amount of water and continued agitation from the refiner wash and dewater unit 50 cleans the fiber. Moreover, agitation of the mixed fibers also removes skin shed by humans left on the carpet.

Additionally, by removing the calcium carbonate and other ash materials on the mixed fibers before introducing the fibers into a centrifuge 52, the centrifuge is only needed to separate the mixed fiber and is not required for additional ash removal. This allows for the use and increases the effectiveness of a two-stage centrifuge which is significantly less expensive than a three-phase centrifuge that would be needed if the centrifuge was also used for equivalent ash removal. Although a two-phase centrifuge is utilized in the process and plant described therein, it is also contemplated that multi-phase centrifuges (i.e., 2 or more phases or stages) may also be utilized.

Additionally by processing the fibers to be recycled in water, the fibers do not heat up and cause undue changes to the chemical and physical make-up of the fibers. As fibers are agitated against each other and the fibers are cut to smaller and smaller sizes, the fibers may generate heat and that heat may change the morphology or crystalline structure of the fiber and other physical and/or chemical properties of the polymer. However, by processing the fibers underwater, the water temperature remains below 100° F. and keeps the fibers cool.

At the refiner wash and dewater unit 50, smaller holes (i.e., 1 mm screen size) are used in the rotary drum screen so that the fibers remain within the drum and calcium carbonate, debris and ash are washed out into the collection tank and subsequently pumped into the water treatment process that separates the calcium carbonate from the process water. The rotary drum screen size of the refiner wash and dewatering unit 50 is smaller than the screen size of the pulper wash and dewatering unit 44. After the refiner wash and dewatering unit, the ash has been removed from the mixed fiber to less than 5% and more preferably less than 1%. The mixed fibers are introduced into a centrifuge feed tank 54 in a slurry of about 50% solids. Process water is added back to the fiber slurry to get to 2% solids. Although the target 2% solids is preferred, it is also contemplated that water may be added in order to achieve a percent solids slurry of about 0.5% to 3%. The feed tank 54 is agitated in order to prevent any settling out of the mixed fibers. The slurry mixture is introduced into the two-phase centrifuge 52. In the centrifuge 52, the nylon fibers are separated from the polypropylene fibers and water. The nylon fibers having a higher specific gravity than water with the polypropylene fibers having a lower specific gravity than water enable the nylon and polypropylene fibers to be separated by a centrifuge. Due to the removal of the ash prior to the centrifuge and cutting of the fiber by the refiner, the separation of the mixed fiber by the centrifuge is extremely effective resulting in nylon fiber with low to no cross contamination of polypropylene and polypropylene fiber with low to no cross contamination of nylon. In the case of a two stage centrifuge, the separated nylon fiber is discharged with a low water content and the separated polypropylene fibers are discharged with the bulk of the water. Any small amounts of ash (e.g. <5% and more preferably <1%) present in the processed material in the centrifuge are discharged with the nylon fibers.

The centrifuge feed tank 54 is agitated to prevent settling of the mixed fibers and prevent clumps of fibers from aggregating together. In this manner, a consistent heterogeneous mixture is introduced into the centrifuge 52.

The centrifuge spins extremely fast so that the nylon fiber discharged from the centrifuge has about 12%-20% moisture by weight. The centrifuge spins to simulate higher gravity in order to accelerate the separation of material with different densities. The nylon fibers having a higher specific gravity than water with the polypropylene fibers having a lower specific gravity than water enable the mixed nylon and polypropylene fibers to be separated by a centrifuge. In the case of a two stage centrifuge, the nylon is discharged with a low water content and the polypropylene fibers are discharged with the bulk of the water. Any small amounts of ash present in the processed material in the centrifuge are discharged with the recovered nylon fibers.

Figure 8:
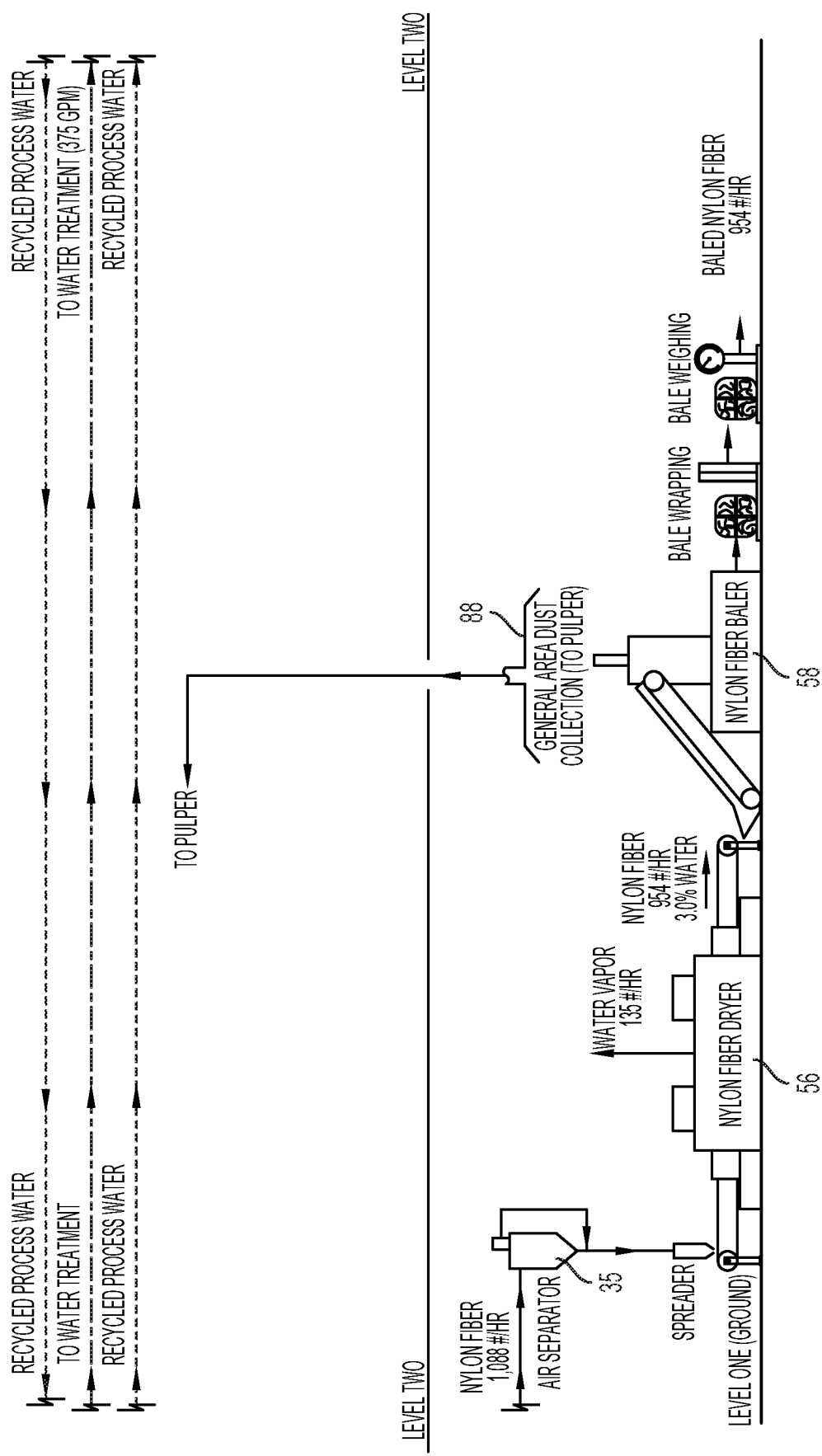
FIG. 8 is a schematic diagram of the nylon fiber dryer.

The discharged nylon fiber may be entrained in air and introduced into the air separator 35 shown in FIG. 8. The nylon fiber from the centrifuge is placed onto a conveyor which passes the nylon fibers through a nylon fiber dryer 56. The nylon fiber may be packaged 58 (e.g., baled) for sale to a buyer. The nylon fiber may also be extruded into pellets for sale to a buyer.

The polypropylene fiber is dewatered 60 so that the polypropylene fibers are brought to about 20% water. The polypropylene fibers may be dried 62 then packaged 64. The polypropylene dried fiber may also be extruded into pellets for sale to a buyer.

Figure 7:
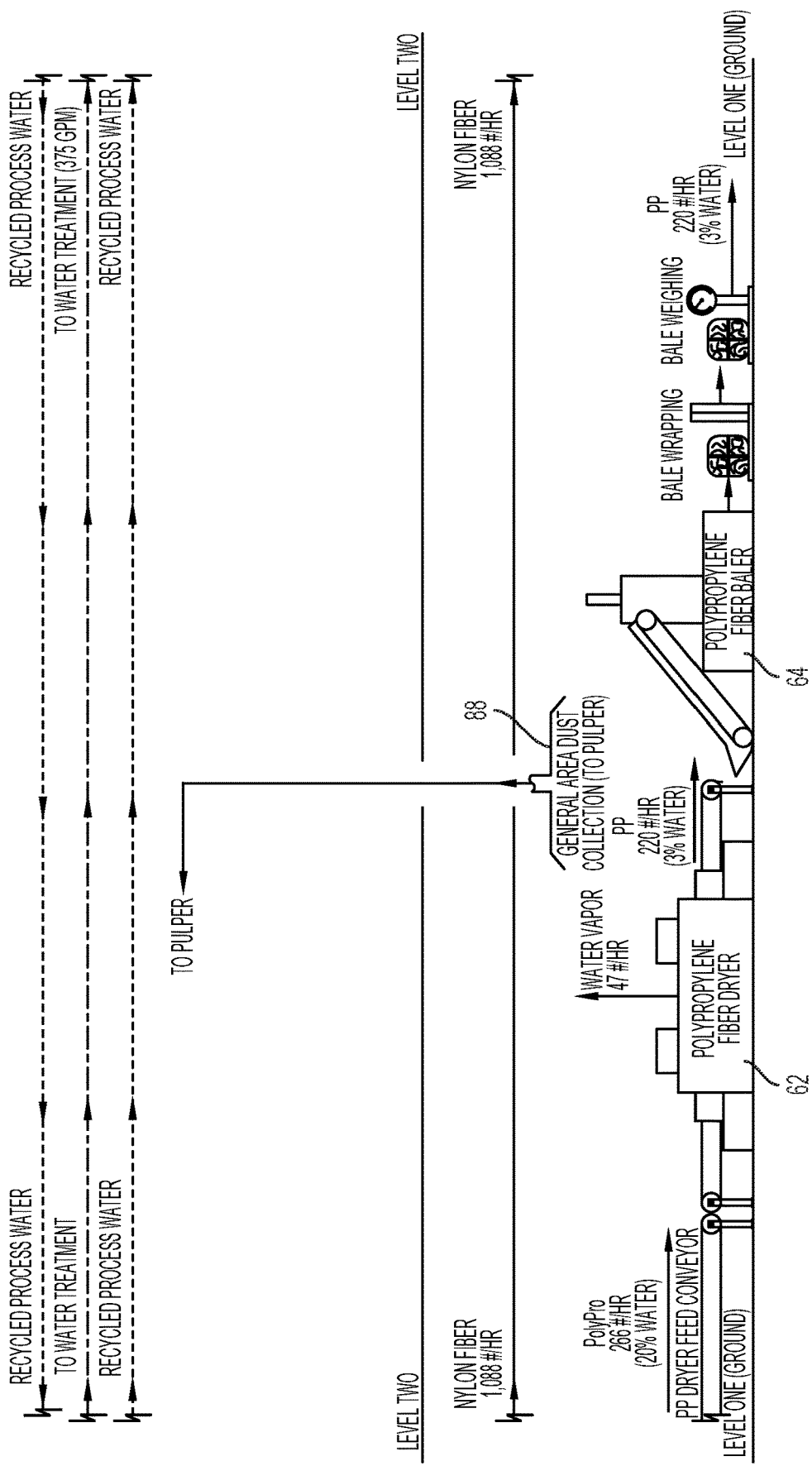
FIG. 7 is a schematic diagram of a polypropylene fiber dryer.

The recovered nylon fiber is about 90% and up to 99.5% pure nylon fiber and the recovered polypropylene fiber is also about 90% and up to 99.5% pure polypropylene fibers. This is a high level of purity that is obtained through the primarily wet recycling process 10 and is also very eco-friendly and protective of employee health in that the dust is retained and also fed back into the recycling process by way of process line 36. Additionally, the areas in which the nylon and polypropylene are dried as shown in FIGS. 7 and 8 will also have a general area dust collector 88. The general area dust collector 88 is needed since the polypropylene fiber and the nylon fibers are dry and have a short length. Any disturbance may cause the fibers to become airborne. The general area dust collector 88 will collect the airborne fibers and transfer them back into the wet pulper 34 so that they are also recycled. One or more general area dust collectors 88 may be located throughout the plant 22 in order to capture any airborne particulates of nylon and polypropylene fibers and calcium carbonate. For example, when the gross size reduced carpet is brought out of the dry processing room, the gross reduced size carpet may have small particulates that can be airborne after having settled on the gross reduced sized carpet. General area dust collectors 88 may be located in the pathway from the exit of the dry processing room 32 and the wet pulper 34.

Referring now to FIG. 1, certain process steps disclose a water discharge 66. Whenever water is discharged, the discharged water follows the process shown in FIG. 2. In particular, the system water discharge 70 is introduced into a rotary drum screen 72. The rotary drum screen 72 retains and separates nylon and polypropylene fiber and transfers 74 those fibers to the wet pulper 34. The rotary drum screen 72 separates the fiber from the water which contains calcium carbonate 76 which is transferred to a storage tank. The water and calcium carbonate 76 is introduced into a filter presses 78*a*, *b*. The filter presses 78*a*, *b* separate the calcium carbonate mixture out of the water. The water 82 is treated 84 (i.e. add chlorine) and returned back into the plant 22 for use in processing the carpet for recycling. The calcium carbonate is dropped onto a loading auger and into a bulk trailer and may have a moisture content of about 50% water. Alternatively, the calcium carbonate may be box loaded.

The filter presses 78*a, b* are batch operations however a continuous filtration operation may also be used. As such, when water from the storage tank 76 is introduced into the filter presses 78*a, b*, they are introduced sequentially. In this regard, water may be introduced into filter press 78*a* and while that filter press is running, water is not introduced into filter press 78*b*. Calcium carbonate is produced from filter press 78*a* and either boxed or transferred to the bulk trailer. When the filter press 78*a* is done with its batch processing, water is introduced into filter press 78*b*. The water is introduced alternatively and sequentially into 78*a* and *b*.

Referring now to FIGS. 4-9, a schematic diagram of the plant 22 shown. The baled carpet 12 is released from the bales and introduced into the shredder 28 by placing the carpet on the shredder feed conveyor 30 by hand. Although the shredder equipment is used by other methods to shred material such as carpet down to very small pieces or down to the fiber, for this process the shredder is used for gross size reduction of whole carpet down to carpet squares ranging from 2" by 2" to 12" by 12" and more preferable between 4" by 4" to 8" by 8." A dust accumulator 88 may be installed above the shredder feed conveyor to collect any dust suspended in air caused by the movement of the carpet. The shredder 28 may discharge carpet into a gross size reduced carpet transport box 90 or conveyer. The shredder 28 may also produce dust and that dust is collected and along with the dust collected by the dust accumulator is introduced into the wet pulper 34 as shown by process lines 36

The carpet may be weighed and introduced into the wet pulper by way of a feed mechanism 42. The feed mechanism as shown in FIG. 1 is a conveyor but in FIG. 5, the feed mechanism may be a mechanical means of lifting and batch dumping the gross size reduced carpet transport box containing the shredded carpet into the pulper 34. Alternatively, the feed mechanism may be a conveyor belt which starts and stops and loads batches into the pulper 34.

Figure 4:
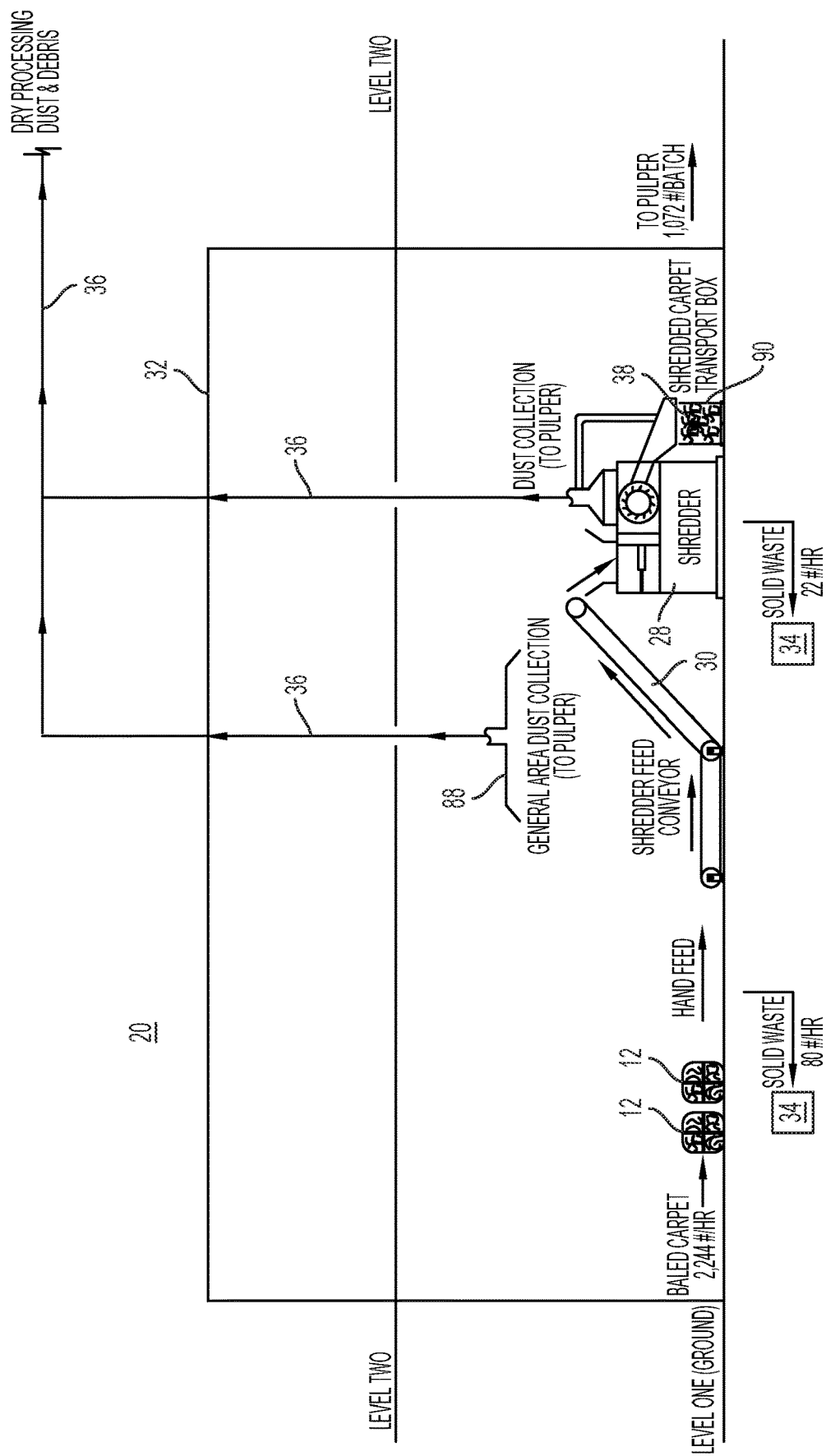
FIG. 4 is a schematic diagram of a dry processing room including a shredder.

As shown in FIG. 4, dust from the shredder and other dry processing operations is separated by way of a dust separator 95. The dust separator 35 discharges the dust into the wet pulper 34 which is filled with water so that the slurry of the gross size reduced carpet and particulates from the dry processing room has a solid content in water at about 6%. The water is added into the wet pulper by way of gravity from the recycled water storage tank 94 containing water. The tank 94 may be at a higher elevation compared to the wet pulper so that water can be rapidly introduced into the wet pulper by way of gravity. By way of example and not limitation, about 2000 gallons of water per minute may be added into the wet pulper 34 per batch.

The slurry discharge from the wet pulper 34 may be introduced into the washer and dewater unit 44 located at an elevation higher than the refiner feed tank 46. The discharge from the wet pulper 34 is pumped up to the washer and dewater unit 44 by way of pump 96. The slurry discharge from the washer and dewater unit 44 is introduced into the refiner feed tank 46 by way of gravity. A pump 98 may be used to transfer the discharge from the refiner feed tank 46 to the refiner 48 and also may be used to pump the slurry discharge to the water from the dewater unit 50 which may be positioned at an elevation higher than the centrifuge feed tank 54. The rest of the process may occur at the same level (i.e. ground-level).

Figure 9:
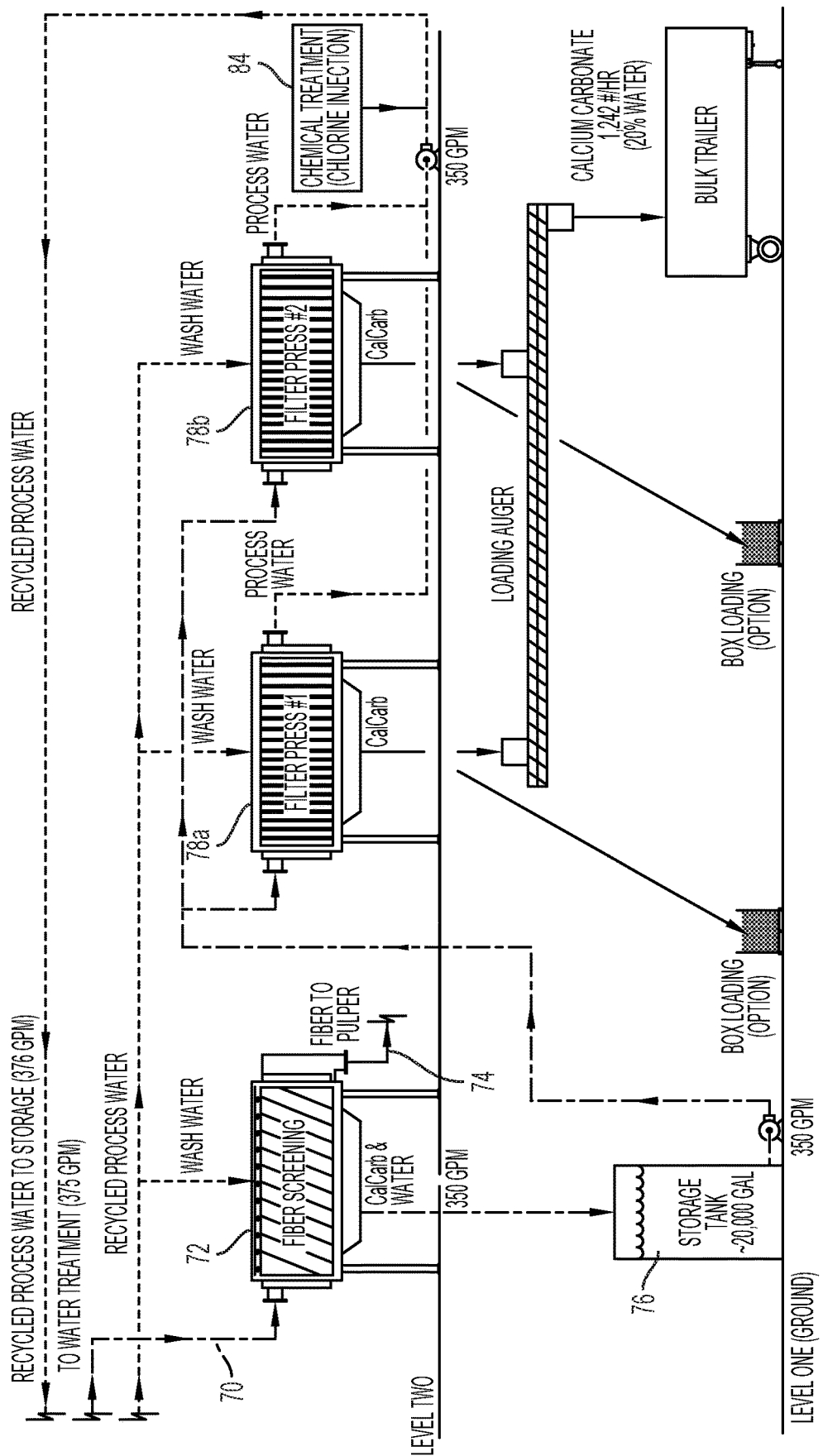
FIG. 9 is a schematic diagram of the water treatment process shown in FIG. 2.

Referring now to FIGS. 2 and 9, the water treatment process is shown by way of a flowchart in FIG. 2 and schematically in FIG. 9. The water is treated at the same elevation compared to the water storage tank 76. Water containing calcium carbonate and other ash solids is introduced into the fiber screening unit 72 by way of line 70. Any removed fiber including nylon fiber and polypropylene fiber is reintroduced into the wet pulper 34 by line 74. The remaining water containing calcium carbonate and other ash solids is transferred into the storage tank 76. A pump pumps the water containing calcium carbonate and other ash materials from the storage tank 76 alternately into the filter presses 78a and 78b. The filter presses 78a, 78b and the chemical treatment system 84 produces clean water that is transferred back into the recycled water storage tank 94 (see FIG. 5). The calcium carbonate is either boxed or loaded onto a bulk trailer.

The shredder 28 may be a 3E Machinery; Single Shaft Shredder; Model WT48150. The wet pulper 34 may be a Bolton Emerson Tornado; Model 36. The washer and dewatering unit 44 may be a Parkson Hycor Rotoshear Rotary Drum; Model HRS6096DV; 2 mm screen. The washer and dewatering unit 50 may be a Parkson Hycor Rotoshear Rotary Drum; Model HRS6096DV; 1 mm screen. The refiner 48 may be a Bolton Emerson Claflin; Model 101. The two-stage centrifuge 52 may be a Andritz; Solid Bowl Decanter Centrifuge, Two Phase; Andritz Model A7-3.2. The fiber dryers 62, 56 may be a Stalam; RF & Forced Air Dryer; Model LTRF 60 kW. The filter presses 78a, 78b may be a Parkson, Plate & Frame Filter Press.

The plant and process may recycle both cut pile and loop pile carpet. Moreover, the plant and process may also recycle both residential and commercial broadloom type carpet. Commercial broadloom carpet has a shorter pile and is typically not recycled to recover its fiber and calcium carbonate because current techniques of recycling carpet do not recover most of the face fiber and primary backing fiber and is thrown away thereby making recycling in this matter not cost-effective. Also commercial broadloom carpet is also in many cases installed using adhesives on the floor. The presence of this adhesive on the carpet to be recycled has hindered earlier attempts to effectively and economically recycle commercial carpet.

The term "nylon" may be used to describe either nylon 6 or nylon 6,6 as the reclaimed carpet face fiber and "polypropylene" to describe the reclaimed carpet primary backing fiber. However, such a description represents a presently preferred embodiment but is merely exemplary and non-limiting relative to the fiber type of the carpet being recycled.

It is also contemplated that the plant and method may be used for only size reduction of the carpet, wet pulping and washing steps for some applications. In these cases, the centrifuge is not used to separate the mixed fiber.

It is also contemplated that the method and plant described herein may be utilized for recycling other commodities that require size reduction, cleaning and separation of materials.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A carpet recycling plant for separating first and second fibers from a carpet, the first and second fibers having different specific gravities, the plant comprising:
   the carpet having the first and second fibers;
   a shredder for gross size reduction of the carpet in a dry state to a size having a surface area greater than 2 square inches defining a gross size reduced carpet;
   a liquid based carpet reducing system filled with liquid which receives the gross size reduced carpet from the shredder to break down the gross size reduced carpet into mixed fibers of the first and second fibers and form a slurry of the mixed first and second fibers;
   a fiber separator receiving the slurry of mixed first and second fiber from the liquid based carpet reducing system;
   wherein before any further size reduction of the gross size reduced carpet under 2 square inches, the gross size reduced carpet including the mixed first and second fibers remain wet until the mixed first and second fibers are separated through the fiber separator.

2. The plant of claim 1 wherein the first and second fibers are respectively nylon fibers and polypropylene fibers and the fiber separator is a centrifuge, and the nylon fibers and the polypropylene fibers remain in a slurry of less than 6% solids after introducing the gross size reduced carpet into the liquid based carpet reducing system and before being outputted by the centrifuge.

3. The plant of claim 1 further comprising a liquid storage tank and wherein the liquid storage tank is positioned at a higher elevation compared to a pulper of the liquid based carpet reducing system so that liquid from the liquid storage tank is introduced into the pulper by gravity feed.

4. The plant of claim 3 wherein liquid from the storage tank is introduced into the pulper so that the slurry of gross size reduced carpet has about 6% solid to liquid ratio.

5. The plant of claim 1 wherein the liquid based carpet reducing system further comprises a first washer and de-liquid unit wherein the carpet slurry is processed through the first washer and de-liquid unit after being processed through a wet pulper of the liquid based carpet reducing system to remove calcium carbonate/SBR nodules in order to separate out the first and second fibers from calcium carbonate.

6. The plant of claim 5 wherein the liquid based carpet reducing system further comprises a liquid treatment area wherein the calcium carbonate and liquid from the first washer and de-liquid unit are transferred to the liquid treatment area to remove the liquid from the calcium carbonate so that the calcium carbonate is greater than 30% calcium carbonate and collected for recycling and the liquid is cleaned and returned to a liquid storage tank which feeds liquid into the wet pulper.

7. The plant of claim 5 wherein the liquid based carpet reducing system further comprises a liquid based refiner and wherein the first and second fibers are respectively nylon fibers and polypropylene fibers, and the nylon fibers and polypropylene fibers are cut to a short length in the liquid-based refiner so that the nylon fibers and polypropylene fibers do not form a bird's nest configuration and the nylon and polypropylene fibers cut in liquid do not heat up and cause undue changes to the chemical and physical make-up of the nylon and polypropylene fibers.

8. The plant of claim 7 wherein the first and second fibers are respectively nylon fibers and polypropylene fibers and are cut to about 5 mm long.

9. The plant of claim 1 wherein the liquid based carpet reducing system further comprises a second washer and de-liquid unit in fluid communication with the refiner which receives the short length first and second fibers which are respectively nylon and polypropylene fibers and agitates the nylon and polypropylene fibers to rub off and clean the residue on an exterior surface of the nylon and polypropylene fibers and further separates calcium carbonate and liquid from the nylon and polypropylene fibers, the separated calcium carbonate and liquid are transferred to a liquid treatment area to remove the liquid from the calcium carbonate so that the calcium carbonate is greater than 30% calcium carbonate for collection and recycling and the liquid is returned to a liquid storage tank which feeds liquid into a liquid based pulper of the liquid based carpet reducing system.

10. The plant of claim 9 wherein the liquid based carpet reducing system further comprises a centrifuge feed tank which receives the nylon and polypropylene fibers from the second washer and de-liquid unit and receives liquid to bring the solids percentage to about 2% solids.

11. The plant of claim 10 wherein the nylon and polypropylene fibers at 2% solids with liquid are introduced into the fiber separator which is a centrifuge to separate the nylon fibers from the polypropylene fibers.

12. The plant of claim 11 wherein the liquid based carpet reducing system further comprises a polypropylene deliquid unit that receives the polypropylene fibers from the centrifuge to bring a moisture content of the polypropylene fibers down below 30% and a polypropylene fiber dryer to bring the moisture content of the polypropylene fibers down to about 3% liquid.

13. The plant of claim 10 further comprising a nylon fiber dryer that receives the nylon fibers from the centrifuge to bring the moisture content of the nylon fibers down to about 5% liquid.

14. The plant of claim 1 wherein the fiber separator is a two stage centrifuge.

15. The plant of claim 1 wherein a purity of the first and second fibers exiting the fiber separator is 90 to 99.5%.

16. The plant of claim 1 wherein the liquid based carpet reducing system further comprises:
 a pulper wash and deliquid unit to wash and remove a majority of calcium carbonate from a pulper's carpet slurry outputted from a liquid based pulper of the liquid based carpet reducing system;
 a liquid based refiner in fluid communication with the pulper wash and deliquid unit to cut fibers outputted from the pulper wash and deliquid unit to a length to allow for fiber separation in the multi stage centrifuge;
 a refiner wash unit in fluid communication with the liquid based refiner to remove any remaining ash.

\* \* \* \* \*